(12) United States Patent
Cornay

(10) Patent No.: US 6,251,020 B1
(45) Date of Patent: Jun. 26, 2001

(54) BALL CAM CENTERING MECHANISM

(76) Inventor: Paul J. Cornay, 1707 N. Main St., Suite 306, Longmont, CO (US) 80501

( * ) Notice: Subject to any disclaimer, the term of this patent is extended or adjusted under 35 U.S.C. 154(b) by 0 days.

(21) Appl. No.: 09/460,578

(22) Filed: Dec. 14, 1999

Related U.S. Application Data

(60) Provisional application No. 60/112,220, filed on Dec. 14, 1998.

(51) Int. Cl.$^7$ ..................................................... F16D 3/33
(52) U.S. Cl. ........................ 464/117; 464/136; 464/905
(58) Field of Search .................... 464/117, 118, 464/113, 114, 125, 128, 136, 11, 12, 134, 112, 905; 403/122, 123, 150, 151, 152, 158, 164, 57

(56) References Cited

U.S. PATENT DOCUMENTS

| | | |
|---|---|---|
| 730,604 | 6/1903 | Brazier . |
| 1,913,783 | 6/1933 | Williams . |
| 2,346,058 | 4/1944 | Waldron . |
| 2,737,791 | 3/1956 | Dillman et al. . |
| 2,780,079 | 2/1957 | Wahlberg . |
| 2,978,886 | 4/1961 | Marquis . |
| 2,981,084 | 4/1961 | Glover . |
| 2,986,022 | 5/1961 | Stokely . |
| 3,064,453 | 11/1962 | Barsness et al. . |
| 4,112,709 * | 9/1978 | Krude ................... 464/112 |
| 4,257,243 | 3/1981 | Herchenback . |
| 4,333,319 * | 6/1982 | Bischoff ................. 464/118 |
| 4,436,515 * | 3/1984 | Mallet ................... 464/118 |
| 4,508,522 | 4/1985 | Numazawa et al. . |
| 4,579,546 | 4/1986 | Pastor . |
| 4,650,439 | 3/1987 | Mayhew . |
| 4,909,641 | 3/1990 | McKenzie . |
| 4,955,741 | 9/1990 | Komeyama . |
| 5,094,651 | 3/1992 | Cornay . |
| 5,277,659 | 1/1994 | Cornay . |
| 5,425,676 | 6/1995 | Cornay . |
| 5,433,667 | 7/1995 | Schafer et al. . |
| 5,525,110 * | 6/1996 | Riccitelli et al. ............ 464/118 |
| 5,718,635 * | 2/1998 | Park et al. ............... 464/114 |
| 5,823,881 | 10/1998 | Cornay . |
| 6,024,645 * | 2/2000 | Tomaru et al. ............ 464/118 |

* cited by examiner

Primary Examiner—Lynne H. Browne
Assistant Examiner—Kenneth Thompson
(74) Attorney, Agent, or Firm—Garvey, Smith, Nehrbass & Doody, L.L.C.

(57) ABSTRACT

A universal, joint (300) includes a centering device (110) for supporting the universal joint and forcing the two joint halves to operate at the same angle thereby causing the joint to operate at constant velocity at all angles. Each shaft (115, 116) of the joint (300) is connected to the centering device (110). Movement of one of the shafts (115, 116) at an angle relative to the longitudinal axis of the coupling device (317) is transmitted to the other shaft (116, 115) by the centering device (110) and the centering device (110) causes the other shaft (116, 115) to likewise move at the same angle relative to the longitudinal axis of the coupling device (317). The centering device (110) includes a cam bearing (cam 101) longitudinally aligned with a cam bearing (cam 102), which arrangement of cam bearings allows a full range of movement of the shafts (115, 116).

7 Claims, 5 Drawing Sheets

BALL CAM CENTERING MECHANISM

CROSS-REFERENCE TO RELATED APPLICATIONS

Hereby incorporated by reference are all of my prior patents, including U.S. Pat. No. 5,823,881 and all references cited therein.

Co-pending U.S. patent application Ser. No. 09/173,614, filed Oct. 16 1998, is also incorporated herein by reference.

Priority of my U.S. Provisional Patent Application Serial No. 60/112,220, filed Dec. 14 1998, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to centering devices. More particularly, the present invention relates to centering devices for universal joints 2. General Background of the Invention Universal joint designers have found it difficult to design constant velocity universal joints capable of operating at high angles, high speeds and high loads simultaneously, due to the limitations of existing constant velocity universal joint centering and supporting devices. This is due to the difficulty in packaging robust internal supporting devices that utilize rolling elements that are capable of operating at typical driveline speeds. Self supported universal joints capable of operating at constant velocity at high angles, high speeds and high torque loads provide design engineers with the following options: higher power transfer capability to driven members (ex. wheels, power takeoffs); more options in drive-line placement; engines can be run at higher r.p.m. resulting in greater fuel economy; and tighter turning radiuses for vehicles.

See U.S. Pat. No. 5,823,881 and all references cited therein for more background of the invention.

BRIEF SUMMARY OF THE INVENTION

The apparatus of the present invention solves the problems confronted in the art in a simple and straightforward manner. What is provided is a ball cam centering mechanism. In a preferred embodiment of the present invention, the ball cam centering mechanism comprises a dual in-line cam centering device for universal joints. The invention is advantageous because it supports the universal joint with robust components in a relatively small package while allowing the universal joint to operate at high angles of misalignment.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
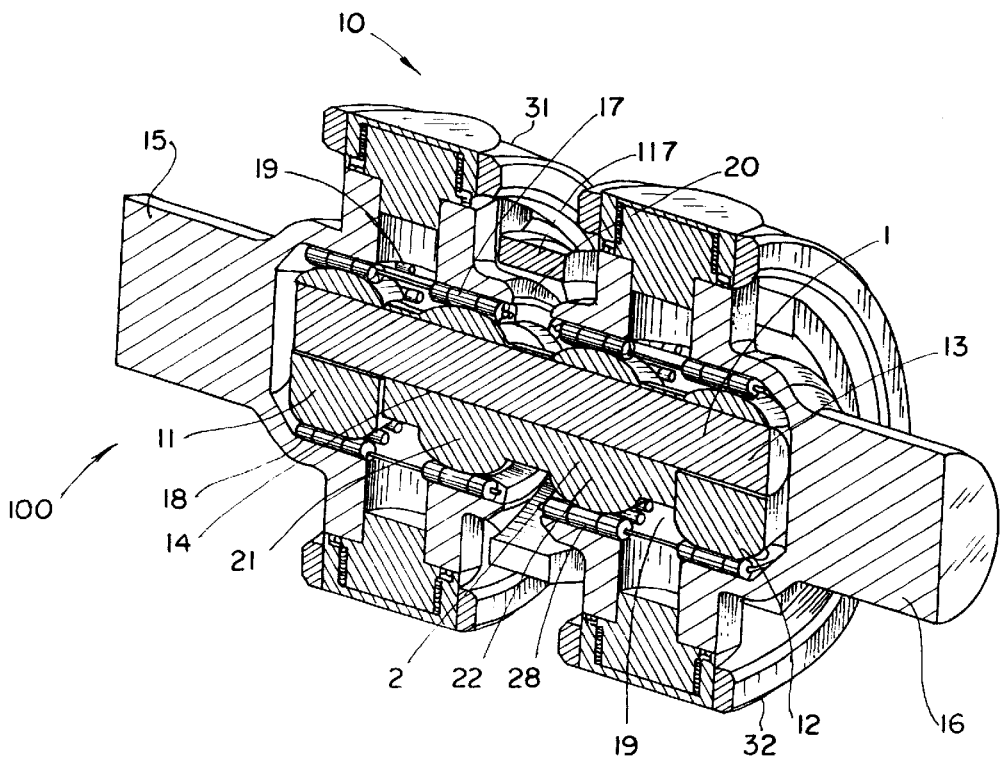
FIG. 1 is a perspective, partially sectional view of a first embodiment of the universal joint apparatus of the present invention with no angular joint displacement.
Figure 3:
FIG. 3 is a perspective view of a cage for roller bearings.
Figure 2:
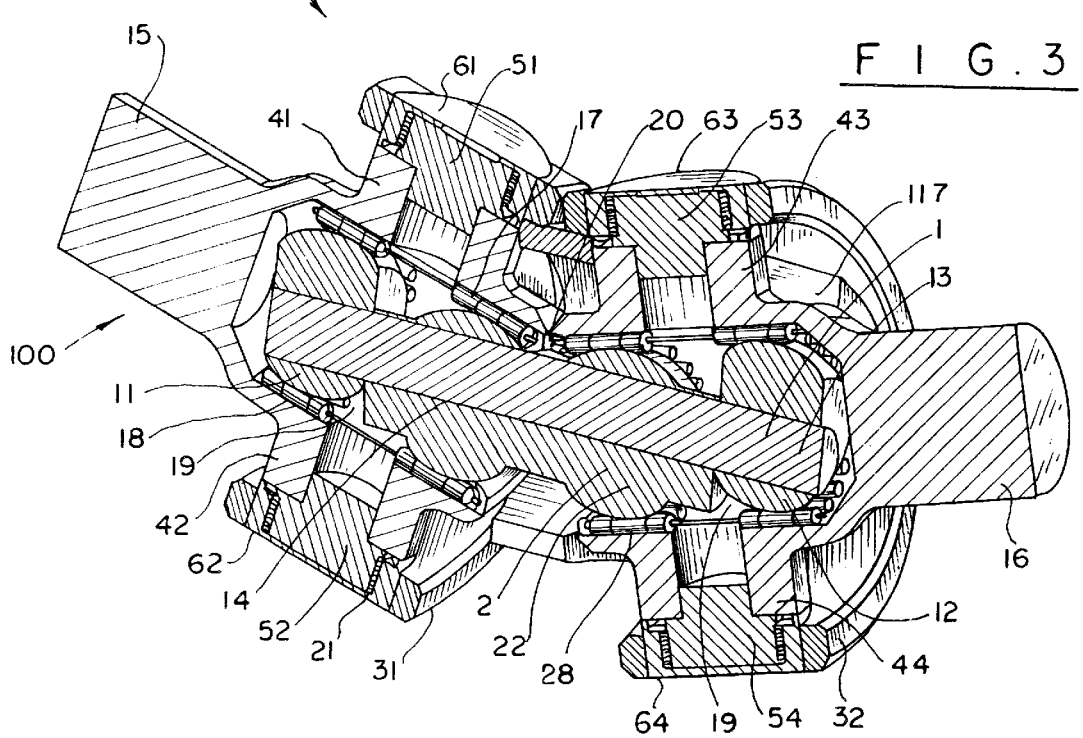
FIG. 2 is a perspective, partially sectional view of the first embodiment of the universal joint apparatus of the present invention with angular joint displacement.

Joint 100 (shown in FIGS. 1 and 2) is a 30 degree joint. Joint 100 includes shafts 15 and 16, rings 31 and 32, and an integral coupling member and dual yokes 117 (which can be the same part as part 117 in U.S. Pat. No. 5,823,881, with similar or same pins interconnecting it to the rings. The ball cam centering mechanism 10 of the first embodiment of the present invention includes cams 1 and 2. Cam 1 is preferably made of ball members 11 and 12 fixedly attached to a rod 13. Cam 2 includes ball members 21 and 22 fixedly attached to one another with a cylindrical member (this cylindrical member and the ball members 21 and 22 could be integral). Cam 2 includes a bore 14 for receiving rod 13 of cam 1.

Dual purpose rollers 17 allow rotational movement of ball members 11, 12, 21, and 22 relative to shafts 15 and 16. Rollers 17 are received in bore 18 in shaft 15 and in bore 28 in shaft 16. Cages 19 support rollers 17. Seals 20 seal open end of bores 18 and 28 to ball portions 21 and 22 of cam 2 to allow lubricating grease to fill bores 18 and 28 and to keep foreign objects out of bores 18 and 28.

Shaft 15 includes a first pin projection 41 and a second pin projection 42. Shaft 16 includes a first pin projection 43 and a second pin projection 44.

First, second, third, and fourth pin members 51, 52, 53, and 54 are received in pin projections 41, 42,43, and 44, respectively. Bearing assemblies 61 and 62 rotatably secure pin members 51 and 52, respectively, in ring 31 and bearing assemblies 63 and 64 rotatably secure pin members 53 and 54, respectively, in ring 32, to join ring 31 to shaft 15 and ring 32 to shaft 16. Similar pin members and bearing assemblies join rings 31 and 32 to integral coupling member and dual yokes 117.

The rolling elements 17 of the present invention allow high speed joint rotation at high joint angles. Dual purpose rollers 17 are in spherical contact with the four spherical portions of cams 1 and 2 (ball members 11 and 12 and ball portions 21 and 22) and are in cylindrical contact with bores 18 and 28 of shafts 15 and 16.

Displacement of cam 1 in relation to cam 2 allows misalignment of shaft 15 in relation to shaft 16.

The present invention could also be used to join two tubes, even if not part of a universal joint (such as in robotics applications).

Cam 1 is preferably made of ball members 11 and 12 fixedly attached to rod 13.

Ball members 11 and 12 can be integral with rod 13.

Assembly of constant velocity universal joint 200

Figure 4:
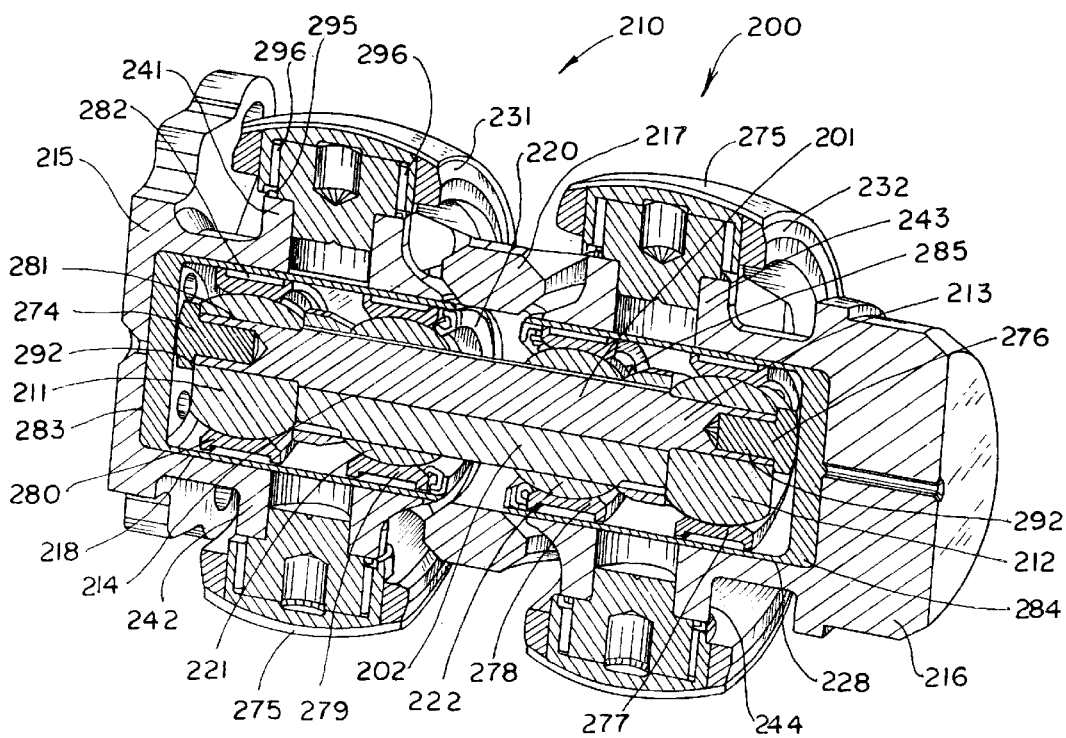
FIG. 4 is a perspective, partially sectional view of a second embodiment of the universal joint apparatus of the present invention with no angular joint displacement.
Figure 5:
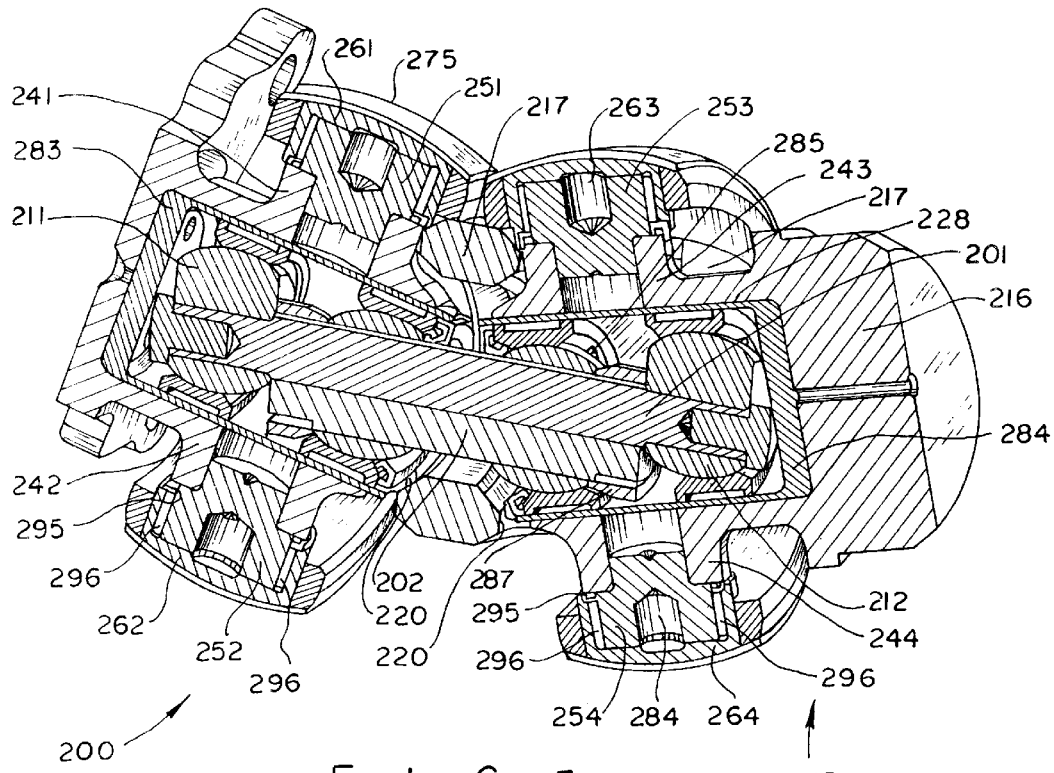
FIG. 5 is a perspective, partially sectional view of the second embodiment of the universal joint apparatus of the present invention with angular joint displacement.
Figure 6:
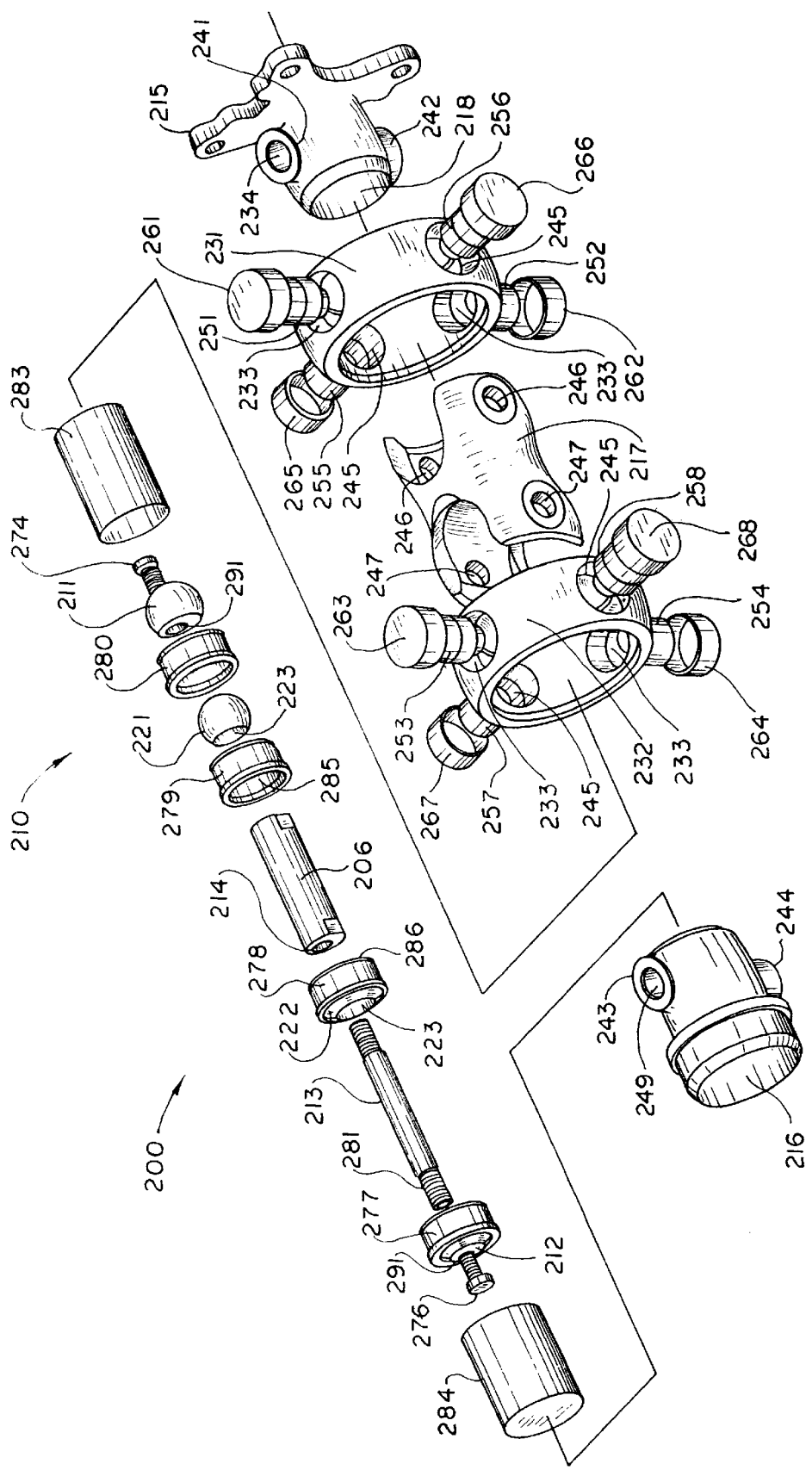
FIG. 6 is a perspective, partially exploded view of the second embodiment of the universal joint apparatus of the present invention with no angular joint displacement.

Universal joint 200 is shown in FIGS. 4–6. Universal joint 200 is a constant velocity 30 degree joint.

Universal joint 200 can be assembled by the following method:

First: Assembly of the centering mechanism 210

Two seals 220 (not shown in FIG. 6) are placed back-to-back over cam 202. Ball member 221 is inserted into notch 285 of race 279 and rotated so that the axis of the hole 223 in ball member 221 is coincident with the axis of the hole in race 279. This method is repeated with ball member 212 and race 277. The assembly of ball member 221 into race 279 is similar to the slotted entry method of assembling rod end bearings. Ball members 221 and 222 with races 279 and 278, respectively, attached thereto are attached to each end of cam 202. Ball members 221 and 222 can be integral with cam 202 or otherwise fixedly attached to one another. Rod 213 is inserted into hole 214 of cam 202. Ball members 211 and 212 are assembled into races 280 and 277, respectively, in the same manner as ball member 221 was assembled into race 279. Ball members 211 and 212 with races 280 and 277 attached thereto are attached to the ends of rod 213 forming cam 201. Ball members 211 and 212 can be attached by pressing female spline 291 in ball member 211 onto splines 281 of rod 213 and repeating that process with ball member 212 on the other end of rod 213. Pins 274 and 276 are pressed into the holes 292 at each end of rod 213. A full complement of needle roller bearings 282 is assembled into groove 286 of bearing race 279. A full complement of needle roller bearings 282 is assembled onto races 277, 278 and 280 as bearings 282 were assembled into groove 286 of race 279. Bearing cup 283 is inserted over needle roller bearings 282 on races 280 and 279 until the round end of pin 274 contacts the bottom of bearing cup 283. Seal 220 is then inserted in to open end of bearing cup 283. This process is repeated with bearing cup 284 inserted over needle bearing rollers 282 on races 277 and 278 and seal 220 pressing into the open end of cup 284. This completes the assembly of the centering mechanism.

The assembly of the remainder of joint 200 is similar to the assembly of prior art joints.

Ring 231 is placed over shaft 215 such that holes 233 in ring 231 are in alignment with the holes 234 in shaft 215. Trunnion pins 251 and 252 are pressed into the holes 234 in shaft 215 and bearing cups 261 and 262 with seals 295 and roller bearings 296 are pressed into holes 233 of ring 231. Connecting yoke 217 is inserted between ring 231 and shaft 215 and trunnion pins 255 and 256 are pressed into holes 246 of yoke 217 and bearing cups 265 and 266 are pressed into holes 245 of ring 231. Ring 232 is attached to connecting yoke 217 by pressing pins 257 and 258 into holes 247 of yoke 217 and pressing bearing cups 267 and 268 into holes 245 of ring 232. Centering device assembly 210 is inserted through ring 232, connecting yoke 217 and into bore 218 of shaft 215. Shaft 216 is inserted over the other end of centering assembly 210 such that the holes 249 in shaft 216 are aligned with the holes 233 of ring 232. Trunnion pins 253 and 254 and bearing cups 263 and 264 are inserted into holes 233 of ring 232 and holes 249 of shaft 216 to complete the assembly of joint 200.

Rod 213, with ball members 211 and 212 fixedly attached thereto, makes up cam 201. Rod 213 of cam 201 rotates in hole 214 of cam 202, which includes ball members 221 and 222 fixedly attached thereto. Shafts 215 and 216 are rotatable with respect to ball members 211,212, 221, and 222.

Cams 201 and 202 cause shafts 215 and 216 to assume the same angle with respect to the longitudinal axis of coupling yoke member 217.

Figure 7:
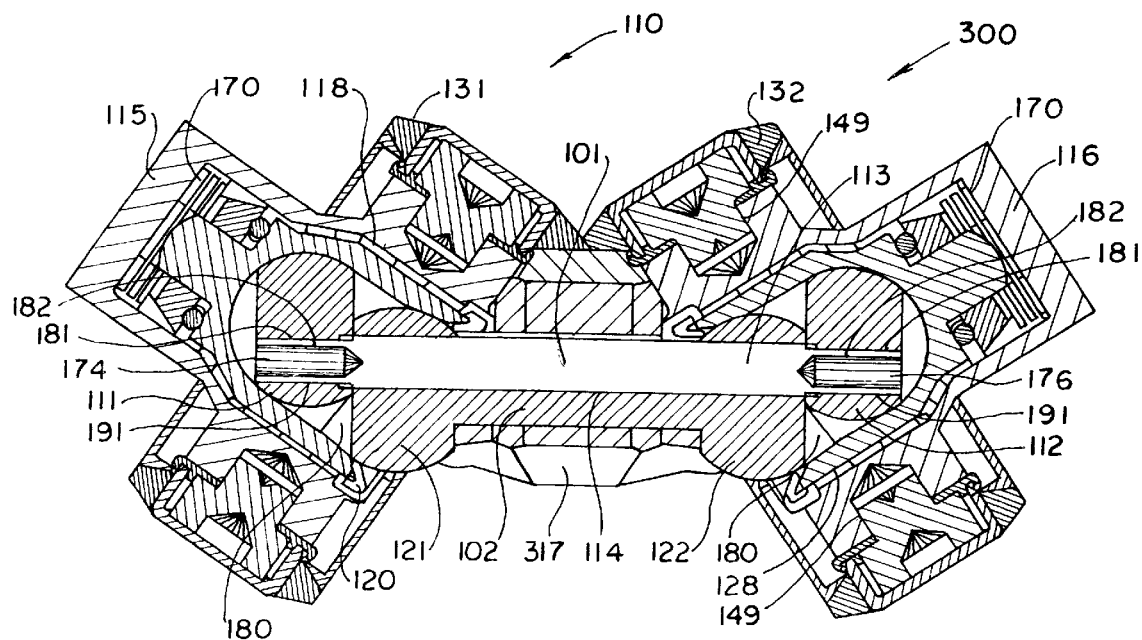
FIG. 7 is a perspective, partially sectional view of the preferred embodiment of the universal joint apparatus of the present invention with angular joint displacement.
Figure 8:
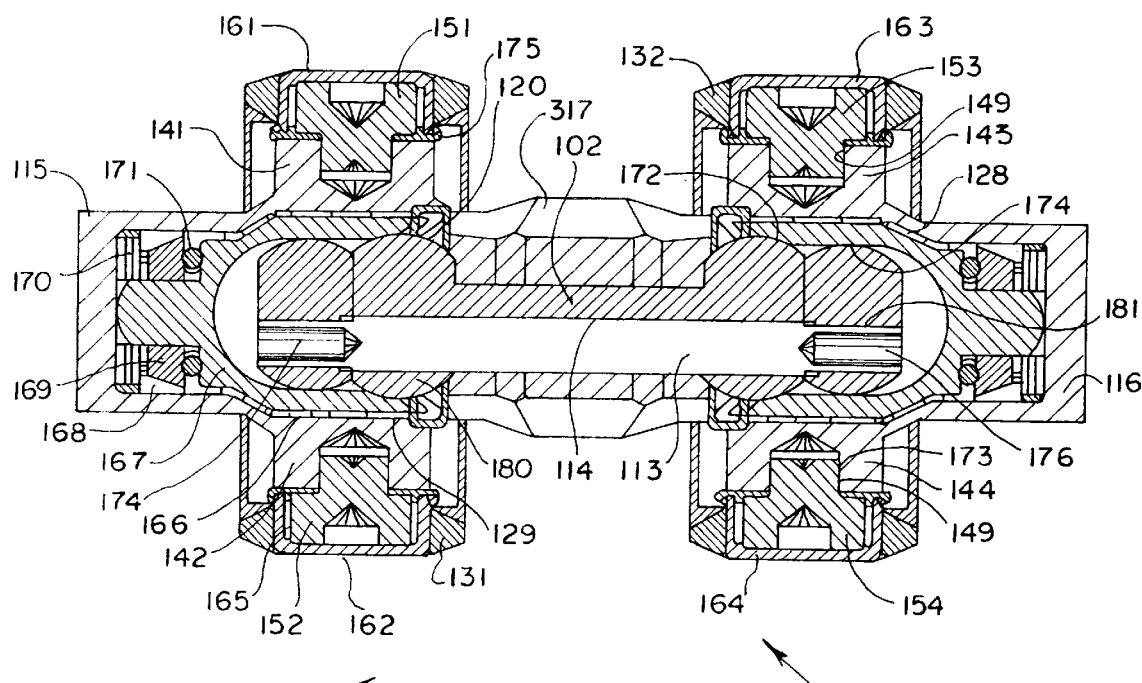
FIG. 8 is a perspective, partially sectional view of the preferred embodiment of the universal joint apparatus of the present invention with no angular joint displacement.
Figure 9:
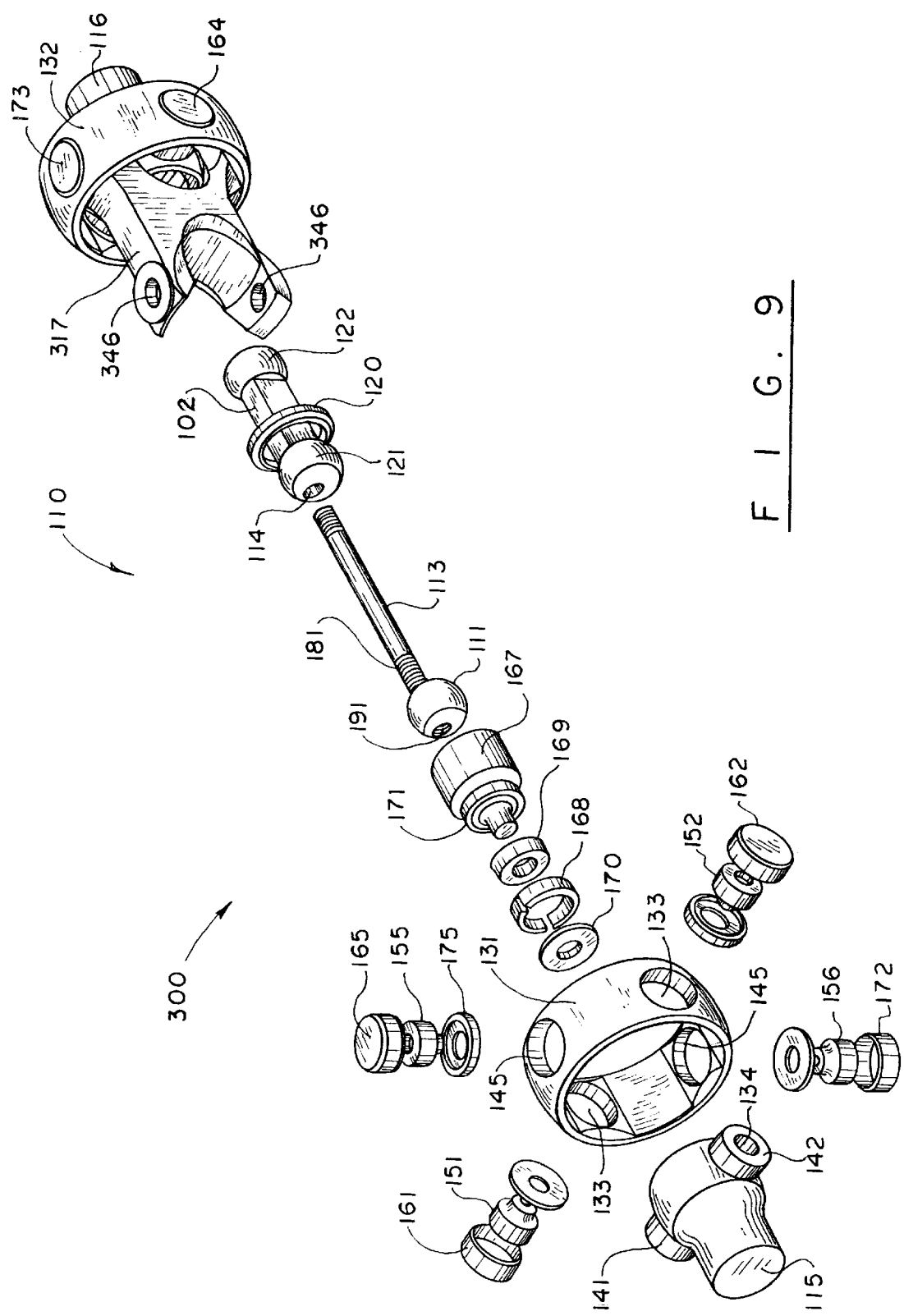
FIG. 9 is a perspective, partially exploded view of the preferred embodiment of the universal joint apparatus of the present invention with no angular joint displacement.

Universal joint 300, shown in FIGS. 7–9, is a constant velocity 65 degree joint.

Assembly of joint 300

Disk springs 170 (such as National Disk Spring Part No. Am188207) are placed into the bottom of bore 118 in shaft 115 and bore 128 in shaft 116. Three piece friction ring 168 is placed in bore 118 of shaft 115 and onto disk spring 170. Thrust bearing race 169 is placed within three-piece friction ring 168. Ball bearings 171 are placed into grooves of thrust bearing race 169. Cam ball race 167 is inserted into bore 118 of shaft 115 and spacer rings 129 and needle bearings 166 are inserted between bore 118 and cam ball race 167. Seal 120 is pressed in to open end of shaft 115. This same procedure is repeated with similar components in shaft 116. Rod 113 is inserted into hole 114 of cam 102. Ball members 111 and 112 are pressed onto splines 181 of rod 113. Expansion pins 174 and 176 are pressed into holes 182 of rod 113, expanding holes 182 to secure the ends of rod 113 to ball members 111 and 112, completing the assembly of cam 101.

Shaft 116 with disk spring 170, three piece friction ring 168, thrust bearing race 169, ball bearings 171, cam ball race 167, spacer rings 129, needle bearings 166, and seal 120 installed therein is assembled on to ring 132 as described for joint 200. Connecting yoke 317 is assembled onto ring 132 as described for below in conjunction with ring 131, with bearing cups 173 pressed into holes 145 in ring 132 . Ring 131 is assembled onto connecting yoke 317 as described for joint 200; specifically, holes 145 of ring 131 are aligned with holes 346 of yoke 317, and pins 155 and 156 are pressed into holes 346, and bearing assemblies 165 and 172 are pressed into holes 145 of ring 131.

Bearing assemblies 161–165, 172, and 173 can be held in place by any commonly practiced bearing retention technique used in universal joints; for example, they could be staked into place, could be secured with snap rings, or spherical bands such as band 275 could be used to secure them in place.

Ball cams 101 and 102, now assembled onto one another, are inserted through ring 131 and connecting yoke 317 and pressed through seal 120 such that ball 122 fits into the tapered opening 180 of cam ball race 167. Shaft 115 is inserted into ring 131 and yoke 317 such that ball cams 101 and 102 are pressed through seal 120 and ball member 121 fits into the tapered opening 180 of cam ball race 167. Shaft 115 is assembled onto ring 131 as described for joint 200. Specifically, holes 134 in shaft 115 are aligned with holes 133 in ring 131, and pins 151 and 152 are inserted into holes 134 of shaft 115. Bearing assemblies 161 and 162 are pressed into holes 133 in ring 131.

Rod 113, with ball members 111 and 112 fixedly attached thereto, makes up cam 101. Rod 113 of cam 101 rotates in hole 114 of cam 102, which includes ball members 121 and 122 fixedly attached thereto. Shafts 115 and 116 are rotatable with respect to ball members 111, 112, 121, and 122.

Cams 101 and 102 cause shafts 115 and 116 to assume the same angle with respect to the longitudinal axis of coupling yoke member 317.

How the ball cam centering mechanism works:

The kinematics of joints 100, 200, and 300 are identical to (or at least very similar to) that of a Double Cardan universal joint, a description of which can be found in the Universal Joint and Drive Shaft Design Manual, AE-7, Published by the Society of Automotive Engineers, Inc. Like the Double Cardan joint, joints 100, 200, and 300 require the use of and internal support or centering device so that joints 100, 200, and 300 are self-supporting and self-aligning. The use of internal support is not necessary when end supports are supplied for the input/output shafts (shafts 15, 16) such as in a marine stern-drive system. However, when only one end support is provided such as in automotive drivelines, axle driveshafts, and steering applications, the use internal support or a centering device is necessary.

The centering devices 10, 210, and 110 of joints 100, 200, and 300 are advantageous over prior art centering mechanisms in the following ways: Centering devices of Double Cardan universal joints allow the joint to operate a constant velocity at a maximum of two joint angles only. Because the ball and socket of the Double Cardan joint drifts out of the bisecting angle plane of the two joint halves and error or inequality between the two joint halves is produced causing the joint to operate at near but not true constant velocity. The effects of Double Cardan centering device location and function can be found on page 112 of SAE's Universal Joint And Drive Shaft Design Manual. The centering mechanism of joints 100, 200, and 300 allow the joint to operate at true constant velocity at all joint angles from 0 to the joints maximum misalignment capability. True constant velocity operation is achieved as a result of maintaining the axis of both cams perpendicular to the bisecting angle plane of joints 100, 200, and 300 at all joint angles. When joint 100 is at a 0 degree angle the ball of cam 1 and the ball members of cam 2 are all in alignment. Movement of one of the shafts (15, 16) at an angle relative to the longitudinal axis of the coupling yoke (117) is transmitted to the other shaft (16, 15) by the centering device (10) and the centering device (10) causes the other shaft (16, 15) to likewise move at the same angle relative to the longitudinal axis of the coupling yoke (117). This is accomplished by allowing cam 1 to rotate within cam 2 resulting in the ball members on the end of cam 1 and cam 2 to be equally displaced.

The centering devices 10, 210, and 110 of joints 100, 200, and 300 are advantageous over other centering mechanisms because they can provide support at high joint angles with less lateral movement within the coupling yoke (117, 217, 317). Reducing lateral movement of a centering device allows designers to concentrate the mass of coupling yokes closer the joints center of rotation thereby reducing the inertia excitation (vibration) caused by this components non-uniform motion characteristics. Limitations in high operating angle are produced as a result of the large lateral displacement requirement of supporting mechanisms of Double Cardan joints resulting increased package size and driveline disturbances.

As can be seen in the drawings, ball members 21, 22, 121, 122, 221, and 222 each have spherical outer surfaces extending from a position at approximately the 35th parallel in the southern hemisphere of the ball member to approximately the 35th parallel in the northern hemisphere of the ball member. The amount of outer surface of the ball members 21, 22, 121, 122, 221, and 222 is determined by the amount of shaft displacement desired for the universal joint. Generally, the minimum amount of outer surface of ball members 21, 22, 121, 122, 221, and 222 is slightly larger than the surface between the two latitudes corresponding to one half of the angular displacement of shafts 15, 16, 115, 116, and 215, 216.

PARTS LIST:

The following is a list of parts and materials suitable for use in the present invention:

1 cam (preferably made of ball members 11 and 12 fixedly attached to rod 13)
2 cam (could be made of 52100 bearing steel having a hardness of 60 HRC)
10 ball cam centering mechanism of the first embodiment of the present invention
11 first ball member of mechanism 10 (could be made of 52100 bearing steel having a hardness of 60 HRC)
12 second ball member of mechanism 10 (could be made of 52100 bearing steel having a hardness of 60 HRC)
13 rod (could be made of 4140 alloy steel having a hardness of 45 HRC) which is free to rotate within through bore 14
14 bore in cam 2
15 shaft (4140 alloy steel)
16 shaft (4140 alloy steel)
17 dual purpose rollers (could be made of 52100 bearing steel having a hardness of 60 HRC)
18 bore in shaft 15 (could have a hardness, for example, of 60 HRC to a depth of 0.040 inches)
19 cages supporting rollers 17
20 seals sealing open end of bores 18 and 28 to ball portions 21 and 22 of cam 2 to allow lubricating grease to fill bores 18 and 28 and to keep foreign objects out of bores 18 and 28
21 third ball member of mechanism 10—first ball portion of cam 2 (could be made of 52100 bearing steel having a hardness of 60 HRC)
22 fourth ball member of mechanism 10—second ball portion of cam 2 (could be made of 52100 bearing steel having a hardness of 60 HRC)
28 bore in shaft 16 (could have a hardness, for example, of 60 HRC to a depth of 0.040 inches)
31 ring
32 ring
41 first pin projection of shaft 15
42 second pin projection of shaft 15
43 first pin projection of shaft 16
44 second pin projection of shaft 16
51 first pin member
52 second pin member
53 third pin member
54 fourth pin member
61 first pin member bearing assembly
62 second pin member bearing assembly
63 third pin member bearing assembly
64 fourth pin member bearing assembly
100 joint
101 cam (preferably made of ball members 111 and 112 fixedly attached to rod 113)
102 cam (could be made of 52100 bearing steel having a hardness of 60 HRC)
110 ball cam centering mechanism of the second embodiment of the present invention
111 first ball member of mechanism 110 (could be made of 52100 bearing steel having a hardness of 60 HRC)
112 second ball member of mechanism 110 (could be made of 52100 bearing steel having a hardness of 60 HRC)
113 rod (could be made of 4140 alloy steel having a hardness of 45 HRC) which is free to rotate within through bore 114
114 bore in cam 102
115 shaft (4140 alloy steel)
116 shaft (4140 alloy steel)
117 integral coupling member and dual yokes (can be the same part as part 117 in U.S. Pat. No. 5,823,881, with similar or same pins interconnecting it to the rings)

118 bore in shaft 115 (could have a hardness, for example, of 60 HRC to a depth of 0.040 inches)
120 seals sealing open end of bores 118 and 118 to ball portions 121 and 122 of cam 102 to allow lubricating grease to fill bores 118 and 128 and to keep foreign objects out of bores 118 and 128
121 third ball member of mechanism 110—first ball portion of cam 102 (could be made of 52100 bearing steel having a hardness of 60 HRC)
122 fourth ball member of mechanism 110—second ball portion of cam 102 (could be made of 52100 bearing steel having a hardness of 60 HRC)
128 bore in shaft 116 (could have a hardness, for example, of 60 HRC to a depth of 0.040 inches)
131 ring
132 ring
133 holes of rings 131 and 132
134 holes in shaft 115
141 first pin projection of shaft 115
142 second pin projection of shaft 115
143 first pin projection of shaft 116
144 second pin projection of shaft 116
145 holes of ring 131 and ring 132
149 holes in shaft 116
151 first pin member of joint 100
152 second pin member of joint 100
153 third pin member of joint 100
154 fourth pin member of joint 100
155 trunnion pin
156 trunnion pin
161 first pin member bearing assembly of joint 300
162 second pin member bearing assembly of joint 300
163 third pin member bearing assembly of joint 300
164 fourth pin member bearing assembly of joint 300
165 bearing cup/bearing assembly of joint 300
166 cylindrical needle rollers (could be made of 52100 bearing steel having a hardness of 60 HRC)
167 cam ball race (made of, e.g., 8620 steel carberized to a hardness of 60 HRC or of 52100 bearing steel having a hardness of 60 HRC)
168 three-piece friction ring
169 thrust bearing race 169
170 disk springs (such as National Disk Spring Part No. Am 188207)
171 ball bearings 171
172 bearing cup/bearing assembly of joint 300
173 bearing cup/bearing assembly of joint 300
174 expansion pin (preferably headless)
175 bearing seal made of, e.g., rubber such as buna N 70 Durometer hardness
176 expansion pin (preferably headless)
180 tapered opening of cam ball race 167
181 splines on rod 113
182 holes of rod 113
191 splines on ball members 111 and 112
200 drive shaft constant velocity joint
201 cam (could be made of 52100 bearing steel having a hardness of 60 HRC—preferably made of ball members 211 and 212 fixedly attached to rod 213)
202 cam (could be made of 52100 bearing steel having a hardness of 60 HRC)
210 ball cam centering mechanism of the second embodiment of the present invention
211 first ball member of mechanism 210 (could be made of 52100 bearing steel having a hardness of 60 HRC)
212 second ball member of mechanism 210 (could be made of 52100 bearing steel having a hardness of 60 HRC)
213 rod (could be made of 4140 alloy steel having a hardness of 45 HRC) which is free to rotate within through bore 214
214 bore in cam 202
215 shaft (4140 alloy steel)
216 shaft (4140 alloy steel)
217 integral coupling member and dual yokes
218 bore in shaft 215 (could have a hardness, for example, of 60 HRC to a depth of 0.040 inches)
220 seals sealing open end of bores 218 and 228 to ball portions 221 and 222 of cam 202 to allow lubricating grease to fill bores 218 and 228 and to keep foreign objects out of bores 218 and 228
221 third ball member of mechanism 210—first ball portion of cam 202 (could be made of 52100 bearing steel having a hardness of 60 HRC)
222 fourth ball member of mechanism 210—second ball portion of cam 202 (could be made of 52100 bearing steel having a hardness of 60 HRC)
223 hole in ball member 221
228 bore in shaft 216 (could have a hardness, for example, of 60 HRC to a depth of 0.040 inches)
231 ring
232 ring
233 holes of rings 231 and 232
234 holes in shaft 215
241 first pin projection of shaft 215
242 second pin projection of shaft 215
243 first pin projection of shaft 216
244 second pin projection of shaft 216
245 holes of ring 231 and ring 232
246 holes of yoke 217
247 holes of yoke 217
249 holes in shaft 216
251 first pin member of joint 200
252 second pin member of joint 200
253 third pin member of joint 200
254 fourth pin member of joint 200
255 trunnion pin
256 trunnion pin
257 pin
258 pin
261 first pin member bearing assembly of joint 200
262 second pin member bearing assembly of joint 200
263 third pin member bearing assembly of joint 200
264 fourth pin member bearing assembly of joint 200
265 bearing cup/bearing assembly of joint 200
266 bearing cup/bearing assembly of joint 200
267 bearing cup/bearing assembly of joint 200
268 bearing cup/bearing assembly of joint 200
274 expansion pin (made of, e.g., 8620 steel carberized to a hardness of 60 HRC or of 52100 bearing steel having a hardness of 60 HRC)
275 spherical band (made of, e.g., 4340 steel)
276 expansion pin (made of, e.g., 8620 steel carberized to a hardness of 60 HRC or of 52100 bearing steel having a hardness of 60 HRC)
277 ball race roller race (made of, e.g., 8620 steel carberized to a hardness of 60 HRC or of 52100 bearing steel having a hardness of 60 HRC)
278 ball race roller race (made of, e.g., 8620 steel carberized to a hardness of 60 HRC or of 52100 bearing steel having a hardness of 60 HRC)
279 ball race roller race (made of, e.g., 8620 steel carberized to a hardness of 60 HRC or of 52100 bearing steel having a hardness of 60 HRC)
280 ball race roller race (made of, e.g., 8620 steel carberized to a hardness of 60 HRC or of 52100 bearing steel having a hardness of 60 HRC) supporting rollers 282 281 splines on rod 213

282 cylindrical needle rollers (could be made of 52100 bearing steel having a hardness of 60 HRC)
283 outer bearing cup (made of, e.g., 8620 steel carberized to a hardness of 60 HRC or of 52100 bearing steel having a hardness of 60 HRC)
284 outer bearing cup (made of, e.g., 8620 steel carberized to a hardness of 60 HRC or of 52100 bearing steel having a hardness of 60 HRC)
285 notch of bearing race 279
286 groove of bearing race 279
287 spacer ring to add surface area to contact ball members 211 and 212
291 splines on ball members 211 and 212
292 holes in rod 213
295 seals of bearing cups 261, 262, 263, 264
296 roller bearings of bearing cups 261, 262, 263, 264
300 universal joint
317 integral coupling member and dual yokes
346 holes of yoke 317

All measurements disclosed herein are at standard temperature and pressure, at sea level on Earth, unless indicated otherwise.

The foregoing embodiments are presented by way of example only; the scope of the present invention is to be limited only by the following claims.

What is claimed is:

1. A universal joint comprising:
(a) first and second rings;
(b) first and second yokes disposed within the first and second rings, respectively;
(c) first and second shafts;
(d) first pin means pivotally interconnecting the first yoke and the first ring;
(e) second pin means pivotally interconnecting the first shaft and the first ring;
(f) third pin means pivotally interconnecting the second yoke and the second ring;
(g) fourth pin means interconnecting the second shaft and the second ring;
(h) a coupling means interconnecting the first yoke and the second yoke;
(i) a plurality of bearing means in each ring, the bearing means in the first ring receiving the first and second pin means, and the bearing means in the second ring receiving the third and fourth pin means; and
(j) centering means interconnecting the first shaft and the second shaft, the centering means comprising a first cam bearing longitudinally aligned with a second cam bearing.

2. The universal joint of claim 1, wherein the first cam bearing comprises first and second ball members attached to a rod member, and the second cam bearing comprises third and fourth ball members rotatable around the rod member.

3. A universal joint comprising:
(a) first and second shafts;
(b) coupling means for transmitting torque from the first shaft to the second shaft;
(c) centering means interconnecting the first shaft and the second shaft for causing the second shaft to move at the same angle relative to the coupling means as does the first shaft, the centering means comprising a first cam bearing longitudinally aligned with a second cam bearing, wherein the first cam bearing comprises first and second ball members attached to a rod member, and the second cam bearing comprises third and fourth ball members rotatable around the rod member.

4. A universal joint comprising:
(a) first and second rings;
(b) first and second yokes disposed within the first and second rings, respectively;
(c) first and second shafts;
(d) first pin means pivotally interconnecting the first yoke and the first ring;
(e) second pin means pivotally interconnecting the first shaft and the first ring;
(f) third pin means pivotally interconnecting the second yoke and the second ring;
(g) fourth pin means interconnecting the second shaft and the second ring;
(h) a coupling means interconnecting the first yoke and the second yoke;
(i) a plurality of bearing means in each ring, the bearing means in the first ring receiving the first and second pin means, and the bearing means in the second ring receiving the third and fourth pin means; and
(j) centering means interconnecting the first shaft and the second shaft, the centering means comprising a first cam bearing longitudinally aligned with a second cam bearing, wherein the first cam bearing comprises first and second ball members attached to a rod member, and the second cam bearing comprises third and fourth ball members rotatable around the rod member.

5. A universal joint comprising:
(a) first and second shafts;
(b) coupling means for transmitting torque from the first shaft to the second shaft;
(c) centering means interconnecting the first shaft and the second shaft for causing the second shaft to move at the same angle relative to the coupling means as does the first shaft, the centering means comprising a first cam bearing longitudinally aligned with a second cam bearing, wherein the first cam bearing comprises first and second ball members attached to a rod member, and the second cam bearing comprises third and fourth ball members rotatable around the rod member.

6. A universal joint comprising:
(a) first and second shafts;
(b) coupling means for transmitting torque from the first shaft to the second shaft;
(c) centering means interconnecting the first shaft and the second shaft for causing the second shaft to move at the same angle relative to the coupling means as does the first shaft, the centering means comprising a first cam bearing longitudinally aligned with a second cam bearing, wherein the first cam bearing comprises first and second ball members attached to a rod member, and the second cam bearing comprises third and fourth ball members rotatable around the rod member, each ball member having a longitudinal axis, and the longitudinal axes of the ball members being aligned when the first and second shafts are aligned and the longitudinal axes of the first and second ball members being offset from the longitudinal axes of the third and fourth ball members when first and second shafts are offset, the ball members being rotatable relative to the first and second shafts.

7. A centering means for a universal joint comprising first and second shafts and having coupling means for transmitting torque from the first shaft to the second shaft, the centering means interconnecting the first shaft and the second shaft for causing the second shaft to move at the same angle relative to the coupling means as does the first shaft, the centering means comprising a first cam bearing longitudinally aligned with a second cam bearing, wherein the first cam bearing comprises first and second ball members fixedly attached to a rod member, and the second cam bearing comprises third and fourth ball members fixedly attached to one another and rotatable around the rod member, each ball member having a longitudinal axis, and the longitudinal axes of the ball members being aligned when the first and second shafts are aligned and the longitudinal axes of the first and second ball members being offset from the longitudinal axes of the third and fourth ball members when first and second shafts are offset, the ball members being rotatable relative to the first and second shafts.

* * * * *